United States Patent [19]

Bhardwaj

[11] Patent Number: 4,703,656

[45] Date of Patent: Nov. 3, 1987

[54] TEMPERATURE INDEPENDENT ULTRASOUND TRANSDUCER DEVICE

[75] Inventor: Mahesh C. Bhardwaj, State College, Pa.

[73] Assignee: Ultran Laboratories, Inc., State College, Pa.

[21] Appl. No.: 849,028

[22] Filed: Apr. 7, 1986

[51] Int. Cl.⁴ ............................................. G01H 11/08
[52] U.S. Cl. ........................................ 73/644; 310/336
[58] Field of Search ................. 73/627, 629, 649, 644; 310/327, 335, 336, 334, 346

[56] References Cited

U.S. PATENT DOCUMENTS

| | | | |
|---|---|---|---|
| Re. 29,785 | 9/1978 | Leschek et al. | 310/327 |
| 3,376,438 | 4/1968 | Colbert | 310/8.2 |
| 3,378,705 | 4/1968 | Bacon | 310/336 |
| 3,427,481 | 2/1969 | Lenahan et al. | 310/327 |
| 3,756,070 | 9/1973 | McElroy | 73/67.8 R |
| 3,890,423 | 6/1975 | Zacharias, Jr. | 310/8.3 |
| 3,950,660 | 4/1976 | McElroy | 310/336 |
| 4,297,607 | 10/1981 | Lynnworth et al. | 310/334 |
| 4,365,515 | 12/1982 | Abts | 73/632 |
| 4,420,707 | 12/1983 | Van Valkenburg | 310/327 |

*Primary Examiner*—Michael J. Tokar
*Assistant Examiner*—Louis M. Arana
*Attorney, Agent, or Firm*—Webb, Burden, Robinson & Webb

[57] ABSTRACT

An ultrasound transducer device for use below and above room temperature comprises a case secured to a cup-shaped ceramic piece having a substantially flat end wall. The outer surface of the end wall comprises a face through which ultrasound is transmitted and received by the transducer device. The cup-shaped ceramic piece has sidewalls extending along the entire periphery of the end face and back into the case. A piezoelectrically active element is bonded to the inner surface of the end wall of the cup-shaped ceramic piece.

17 Claims, 6 Drawing Figures

TEMPERATURE INDEPENDENT ULTRASOUND TRANSDUCER DEVICE

FIELD OF THE INVENTION

This invention relates to the field of ultrasound tranducers and more specifically to ultrasound transducers for use below and above room temperature.

BACKGROUND

Ultrasound is used for many purposes including the detection of defects in materials, thickness and corrosion monitoring, acoustic and mechanical properties measurements, fluid level measurements, remote sensing of objects through air, particulate measurements in fluids, and so on. The significance of ultrasound in such applications, particularly on solid materials, is that the test are entirely nondestructive in nature. Furthermore, few or no sample preparations are required and in general access to only one side of the test sample is sufficient.

The principle of ultrasound in such applications is simple. Certain materials, known as piezoelectric materials, emit electricity when mechanical waves are applied to their surfaces. Conversely, these materials emit mechanical or ultrasonic waves when an electrical voltage is applied on their faces. The frequency of waves so generated is determined by a given piezoelectric material's thickness and its frequency constants. Ultrasound waves from a piezoelectric material (properly housed inside a transducer device) when introduced into materials, behave much like the light waves. That is, they are reflected, refracted, diffracted, transmitted and so on. If the propagating ultrasonic beam encounters a physical discontinuity, such as a flaw, pore, crack, or a gross chemical heterogeneity, a portion of ultrasonic energy is reflected back to the piezoelectric material by such a discontinuity. The rest of the ultrasonic energy continues to propagate in the material until it meets the end of the material, generally its far side. All this information may be displayed on an oscilloscope screen in the form of reflected or transmitted signals. From this information, sound velocity, presence or absence of defects, thickness or corrosion of the materials, for example can be estimated.

Ultrasonic techniques are thus used in a wide variety of industries. The industrial functions served by ultrasonic nondestructive methods include quality control, quality assurance, product control, process control, research and development of materials. The major implications of ultrasonic uses are safety in materials application and economy in the materials manufacture.

Heretofore, the environment in which ultrasonic testing was performed was generally confined to near room temperature (20° C.) and pressure conditions. However, it is common knowledge that manufacture and applications of most materials involve elevated temperatures. Therefore, in order to monitor the conditions of the materials in situ it is desirable to be able to conduct ultrasonic testing at elevated temperatures.

Ultrasonic testing equipment is essentially composed of two parts: the transducer device, and the electronic instruments. While the electronic instrument can be kept away from the extremities of the test environment, the transducer, the most critical and important part of the ultrasonic testing system, often is in contact with the test part. Thus, the transducer must withstand the conditions of test part; it must perform satisfactorily at high temperatures.

Designs for ultrasound transducers are legend. The structure often comprises a case for supporting a piezoelectric element sandwiched between a wear plate and a damping material. See for example U.S. Pat. No. 3,376,438.

The current commercial transducers of which applicant is aware cannot satisfactorily withstand elevated temperatures. Their use is generally confined to $-10°$ to 70° C. Transducer designs to withstand elevated temperatures in the neighborhood of 200° C. either utilize complex cooling systems or sound transfer bars that space the transducer from the hot surface of material. Both approaches have drawbacks: cooling is unreliable and therefore the transducer is subject to degradation. Space bars complicate the interpretation of data and attenuate the ultrasound. Further, none of these approaches can be used on hot surfaces on a continuous basis.

A reason for the unsuitability of commercial transducers when used at elevated temperatures is that various materials and mechanical designs used in the transducer device are not sufficiently temperature resistant. One such material in all commercial transducers is an organic polymer. An organic polymer, in the form of epoxies, rubbers, etc., is used for bonding, potting, and sealing of the transducer components. Even the best commercially available organic polymers cannot withstand temperatures beyond 250° C. Moreover, in the presence of certain acoustic coupling liquids, the organic polymers are even less stable on hot surfaces. Even if the best available materials were used with existing mechanical designs, the transducers would not be sufficiently temperature resistant.

The piezoelectric element is usually but not always a circular disc of a thickness corresponding to its resonant frequency. It usually possesses metallized layers on both faces, such as the ones obtained by thick film or thin film deposition techniques. The damping material is generally composed of heavy metal powder, such as tungsten, molybdenum, nickel, copper, iron, chromium, etc. immersed tightly in an organic polymer, such as polyurethane or other rubber like materials. The damping may utilize, either a single metal powder, or it may use the combination of several powders. The damping material provides two important functions: it helps in minimizing the excessive resonance (ringing) of the piezoelectric material and it eliminates spurious ultrasonic reflections that may be generated by the structure of the damping itself.

Typically, in the case of hard faced contact transducer devices the damped piezoelectric material is bonded to a metallized hard wear face with an organic polymer, such as an epoxy. The purpose of the wear face is to protect the critical piezoelectric material, which in general is a mechanically weaker material. The commonly used wear faces are dense alumina, tungsten carbide, or any other super-hard materials.

In order to apply electrical voltage to the transducer, a ground lead is soldered on a metallized surface on the piezoelectrical material in contact with the wear face material. The positive electrical lead is often taken from the top face of the piezoelectric material that is in contact with the damping material.

The above assembly is secured inside an appropriate case by a potting material. The case material is generally steel. The potting material is generally an organic polymer, such as an epoxy.

After all the bonding, potting, and sealing compounds have been cured, the positive and ground leads are either connected to a co-axial cable, or they are terminated directly on the casing with a high frequency co-axial connector.

SUMMARY OF THE INVENTION

Briefly, according to this invention there is provided a substantially temperature insensitive ultrasound transducer device. A surface through which ultrasound is transmitted and received is configured to transfer ultrasound to the sample or material being tested. In the case of hard faced contact transducer devices, this surface is a hard wear face that makes direct contact with the sample surface. Often a thin layer of acoustic liquid is placed between the wear face and the sample surface. The transducer device comprises a case having walls defining an enclosure. Preferably, the case has a cylindrical metal sidewall and a flat metal rear end wall. The transducer device further comprises a ceramic cup, the axial end wall thereof supporting the aforesaid wear face. The ceramic cup may have a variety of external configurations. For example, it may have circular cylindrical sidewalls, sidewalls generated by a line parallel to a reference axis, spherical sidewalls, or almost any sidewall configuration that opens at one end. The interior face of the end wall of the cup is substantially flat. Preferably, the wear face itself is substantially flat and parallel to the inner face and both are spaced apart at least approximately one-quarter wavelength ($\lambda/4$) of the ultrasound being transmitted. Thus, the optimum thickness relates to the frequency and type of ceramic material. Typically the thickness for say, dense alumina, will range from 0.015 to 0.040 inch (0.038 to 0.102 cm) and will normally be 0.025 inch (0.064 cm). The sidewalls, which are thicker than the end face of the cup, extend back away from the wear face. The outer diameter of the cup is less than the inner diameter of the case so that the cup may be telescoped within the case. An adhesive material joins and seals the cup to the case. The adhesive material must be selected to withstand the intended temperature of use of the transducer device. The metal case need not and preferably does not extend entirely to the wear face nor is it necessary that the adhesive extend to the axial end of the case near the wear face. In this way, the penetrating effect of the acoustic liquid into the adhesive securing the cup and the case (which effect is intensified by heat and ultrasound) can be reduced or eliminated.

A piezoelectrically active element, preferably a thin disk, is bonded to the flat interior of the end wall of the ceramic cup. The bond may be effected by the use of a high temperature electrically conductive adhesive or by brazing with a solder that has a softening or melting point above the temperature of use, that is, well above room temperature.

THE DRAWINGS

Further features and other objects and advantages of this invention will become clear from the following detailed description made with reference to the drawings in which FIG. 1 is a section view through the preferred embodiment of a transducer device according to this invention;

DESCRIPTION OF THE PREFERRED EMBODIMENTS

Figure 1:
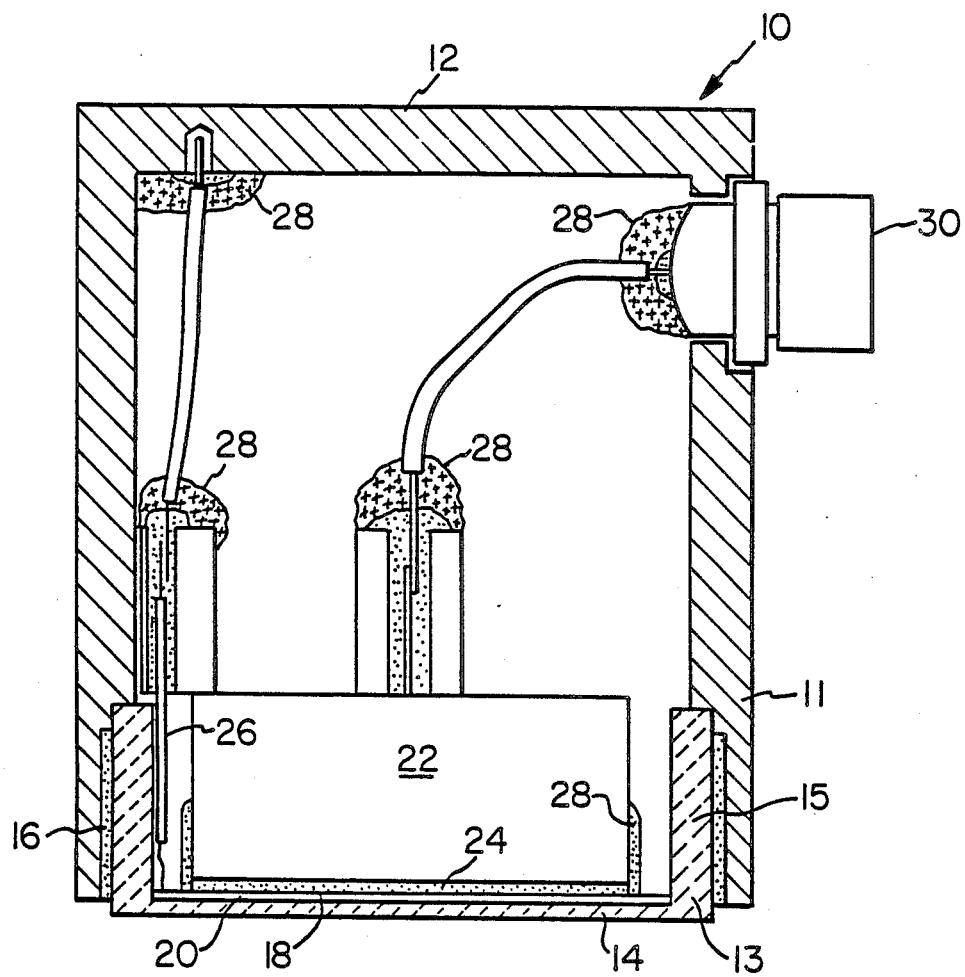

Referring now to FIG. 1, there is shown a substantially temperature insensitive ultrasound transducer device according to a preferred embodiment of this invention. The specific embodiment described is a hard face contact transducer device that may be used for weeks continously with the wear face at a temperature of 230° C. without detectable deterioration and without a change in output characteristics. The device comprises a metal case 10, for example, having a cylindrical sidewall 11 and an axial end wall. A ceramic cup 13 defines a flat axial end wall 14 the outer surface of which serves as a wear face. Extending from the flat end is a cylindrical sidewall 15. The outer diameter of the sidewall of the ceramic cup is less than the inner diameter of the metal case such that the cup may be positioned within the case as shown. Only a portion of the sidewall 15 needs to be cylindrical or circular. The sidewall may, for example, be conical adjacent the hard face. In an especially preferred embodiment, a rabbeted joint is enabled by an annular recess in the cylindrical wall of the case. Also, especially preferred, the case does not extend entirely along the walls of the ceramic cup to the hard face but stands off from the hard face, say, 0.125 inch (0.3 cm).

The ceramic cup and metal case may be secured together by mechanical devices such as set screws or by a suitably temperature resistant adhesive 16 or both. A satisfactory adhesive for temperatures above 200° C. is an epoxy resin that is characterized by a closed chain structure. Some form of adhesive seal is desirable even if the cup and case are mechanically secured.

A disk shaped piezoelectrical crystal 18 is secured to the flat inside face of the flat end wall of the ceramic cup. A lead meta-niobate or lithium meta-niobate crystal was required for continuous use in excess of 200° C. The crystal may be secured by soldering or brazing as will be explained hereafter or by a high temperature electrically conductive organic adhesive such as a suitable high temperature epoxy adhesive 20. A suitable adhesive for this purpose is an epoxy that is characterized by closed chain molecular structure, which is filled with ultra-fine flakes of silver or gold. The epoxy adhesive has silver flake therein which gives it its electrical conductivity. The epoxy adhesive is thermosetting and must retain sufficient strength to perform its bonding functions at the temperatures at which the transducer device is used. The applicant has found that in the present configuration, the above identified epoxy adhesives can withstand weeks of service at more than 230° C. (446° F.).

A damping block 22 may be secured to the side of the piezoelectric crystal that is not secured to the inner surface of the end wall of the cup. The damping material, in the preferred embodiment comprises a high temperature resistant polymer, such as an epoxy or rubber, the molecular structure of which is characterized by closed chain arrangement of atoms. The damping and crystal are bonded together with a conductive epoxy adhesive 24 which may be the same as used between the crystal and the cup.

Ground wire 26 is secured at one end to the layer of conductive adhesive 20 between the crystal and the cup and at the other end to the case. Conductive epoxy adhesive may be used at each end. For extra security nonconductive epoxy adhesive 28 may be used to pot all or portions of the ground wire. A positive lead wire is secured to one end of the layer of conductive epoxy adhesive 24 and to the terminal on a standard receptacle 30 mounted in the cylindrical sidewall of the case. This lead wire may be secured by conductive adhesive and potted with nonconductive adhesive as with the ground wire. It may also be desirable to pot the edges of the crystal and the sides of the damping near the crystal with nonconductive epoxy.

A hard face contact transducer device was fabricated substantially as described above and was placed with its wear face upon a hot plate heated to 230° C. The transducer device was connected to instruments for sending and detecting ultrasound signals. The transducer continued to function without apparent degradation for two weeks at which time testing was discontinued. By comparison, a transducer made substantially the same way but having a disk shaped wear face without sidewalls ceased to function properly in a matter of hours. The flaws were apparent. The internal leads came loose from the piezoelectric crystal resulting in the signal that constantly varied. Also, the wear plate itself developed tiny cracks throughout. While applicant does not wish to be limited by any theory, it does appear that the sidewalls of the ceramic cup provided unexpected protection for the piezoelectric crystal and the bonding materials securing the piezoelectric crystal to the inner face of the end wall of the cup. Further, in a manner not completely understood, the sidewalls strengthen the end wall of the ceramic cup to resist cracking that is brought about by the combined effect of heat and ultrasound.

Figure 3:
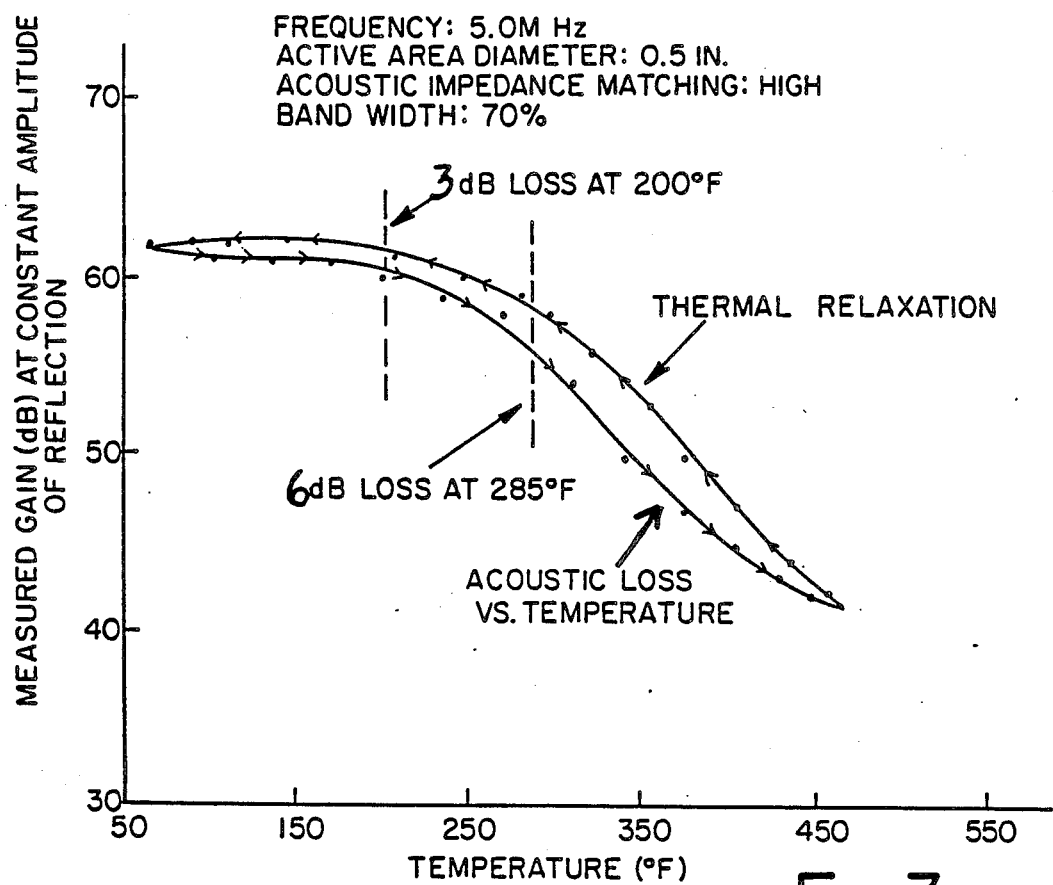
FIG. 3 is a plot of gain vs. temperature for a transducer device according to this invention.

FIG. 3 shows the actual thermal hysteresis loop for 0.5 inch active area diameter, 5 MHz transducer device according to this invention. Transducer stability is apparent from the fact that the loop is relatively narrow, i.e., the top curve, representative of thermal relaxation, is very close to the bottom curve, representing ultrasonic losses as a function of increasing temperature. Transducer devices have been tested up to 460° C. (240° C.) for several days with not even a single dB variation in the reflected amplitude. The transducer devices have been subjected to thermal fatigue tests: they have been cycled from high to room temperature and vice versa a number of times without any apparent mechanical or acoustic damage. Observations indicate that this high temperature transducer design is mechanically much superior than its commercial room temperature counterparts.

Figure 4:
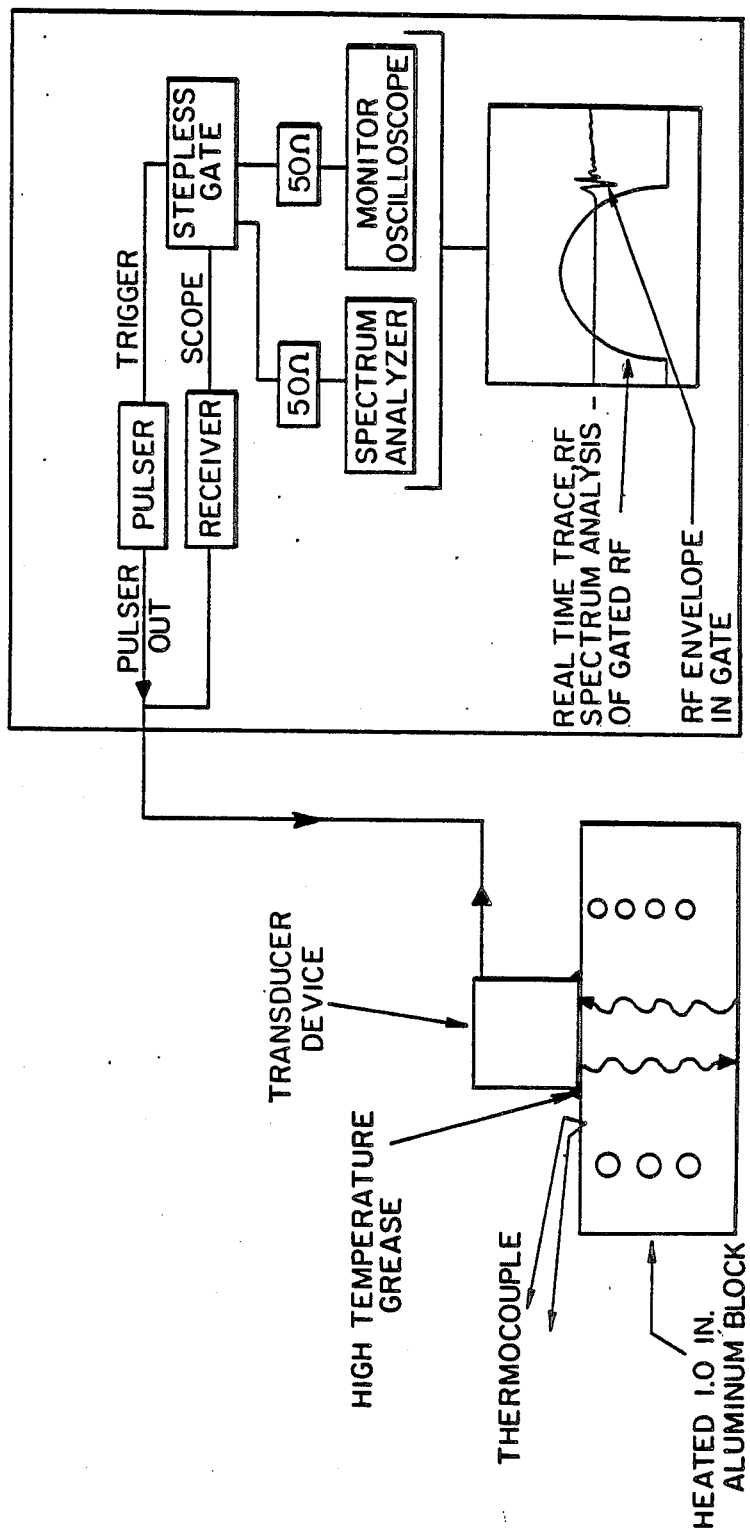
FIG. 4 is a schematic diagram of the test apparatus used for obtaining temperature sensitivity data.

Referring to FIG. 4, the general test procedures will now be explained: (An ultrasonic transducer device is coupled to an internally heated 1.0 inch aluminum test block with a high temperature grease, such as used in high temperature vacuum applications.) The electrical leads of the transducer are co-axially connected to a pulse generator and other electronic equipment as shown in FIG. 4. The reflected amplitude of ultrasound from aluminum test block was adjusted to yield 100% response on the oscilloscope by adjusting the gain on the receiver/amplifier. At this point the receiver gain and temperature of the test block are recorded. The temperature of the internal heater is slowly increased. At each temperature the receiver gain is adjusted to yield constant 100% amplitude of the reflected signal.

A number of specific experiments were performed in this manner in order to determine the transducer performance as well as to study other parameters of practical importance.

Thermal hysteresis is an important measure of suitability for use at elevated temperatures, especially varying temperatures. A 5.0 MHz and 0.5 inch active area diameter hard face contact transducer device made according to this invention was subjected to tests as per the above-mentioned experimental procedures. After the device reached 460° F., the temperature of the aluminum test block was slowly lowered and the reflected amplitude of ultrasound from aluminum test block adjusted to 100% on the oscilloscope by varying the receiver gain. These observations were recorded until the room temperature was achieved. Variation in the receiver gain as a function of temperature is shown in FIG. 3. From this, the transducer stability is apparent due to the fact that the hysteresis loop is relatively narrow. That is, the top curve, representative of thermal relaxation, is very close (between 1 and 3 dB) to the bottom curve, representing ultrasonic losses as a function of temperature. For example, the loss of reflected signal amplitude at 200° F. (93° C.) is 2 dB; at 285° F. (140° C.) it is 6 dB; and at 460° F. (238° C.) it is 20 dB. It is important to note that throughout the experiment, couplant (coupling grease) between the transducer and heated test block was applied only once, i.e., at the initiation of the experiment. Effects of couplant on the transducer sensitivity as a function of temperature were determined in a separate experiment.

A number of devices made according to this invention were tested as function of temperature for days without apparent fluctuations in the strength of the reflected signals. These devices have also been subjected to thermal fatigue tests, i.e., they have been repeatedly cycled from high to RTP (room temperature pressure) and vice versa without observing acoustic or mechanical weakness in the invented design. In order to determine the low temperature stability of these devices, they were subjected to −40° F. (−40° C.) without any observable damage. So it is concluded that transducers prepared according to the procedures described herein, the workable range of these transducers for continuous operation is at least from −40° F. to 460° F. So far, all observations indicate that this high temperature design is also mechanically superior than its commercial room temperature counterparts.

Figure 5:
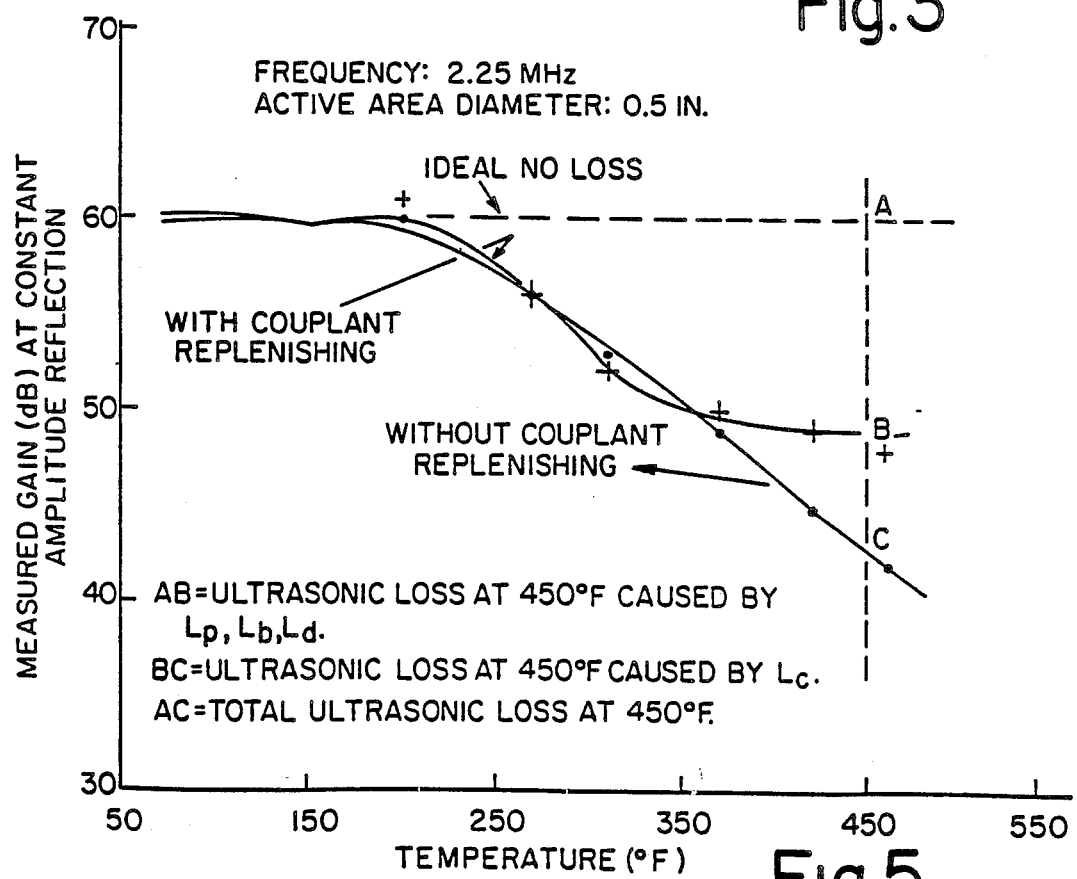
FIG. 5 is a plot of gain vs. temperature for showing the temperature sensitivity of the couplant.

In order to determine the effects of couplant (coupling grease) between transducer and test block as a function of temperature, separate experiments were carried out by using the experimental procedure described above. A 2.25 MHz and 0.5 inch active area diameter hard face contact transducer device made according to this invention was tested as a function of temperature. At each temperature setting one observation of reflected signal strength was made without replenishing the couplant, while another was made by replenishing the couplant. These data are shown in FIG. 5. From these observations it is clear that the effects of couplant are significant beyond 350° F. (177°

C.); for example, by replenishing the couplant at 450° F. a gain of 6 dB is obtained in the strength of reflected signal amplitude.

Figure 6:
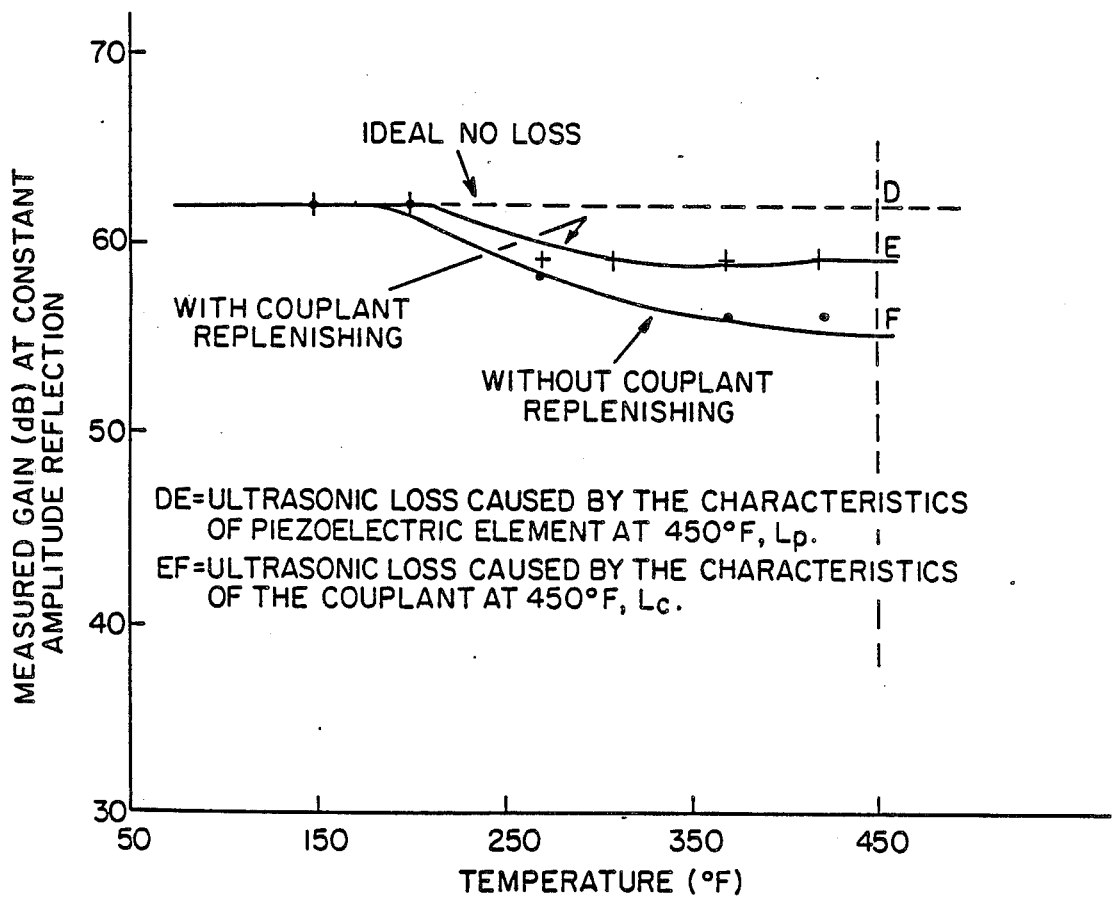
FIG. 6 is a plot of gain vs. temperature for an unprotected piezoelectric element.

In a separate experiment, a control, comprising only the piezoelectric element, such as lead meta-niobate corresponding to a trade name K-81 and manufactured by Keramos, Inc. of Lizton, Indiana, was studied as a function of temperature with and without replenishing the couplant. Observations of this experiment for 2.25 MHz and 0.5 inch diameter piezoelectric element are shown in FIG. 6. From here it is observed that the effects of couplant become prominent around 300° F. (149° C.), and at 450° F. (232° C.) a gain of 4 dB is observed by replenishing the couplant.

The total loss of ultrasonic sensitivity as a function of temperature can be summarized as follows:

$$L_t = L_p + L_c + L_b + L_d + C \qquad (1)$$

where $L_t$ = Total ultrasonic losses at a given temperature;
$L_p$ = Loss caused by the inherent characteristics of the piezoelectric element;
$L_c$ = Loss caused by the couplant;
$L_b$ = Loss caused by the transducer bonding materials;
$L_d$ = Loss caused by the transducer facing and damping materials; and
$C$ = Is a constant depending upon the effects of test materials, electrical leads, and experimental setup at a given temperature.

In the aforementioned experiments all parameters in constant C were not varied, thus no attempt was made to determine their effects as a function of temperature. Since ultrasonic parameters of a given test material as a function of temperature would provide meaningful information about the test material, the experimental procedures and observations given here should be regarded important in determining the in situ effects of temperature on the acoustic parameters of the test material.

The effects of damping, bonding, and facing materials in the transducer device of this invention, say at 450° F. derived as follows:

$L_t$, total ultrasonic loss: 17 dB, from AC in FIG. 5;
$L_p$, loss due to the piezoelectric element: 3 dB, from DE in FIG. 6:
$L_c$, loss due to the couplant: 6 dB, from BC in FIG. 5.

Therefore, from equation 1, the total loss caused by the transducer components and elements of contact. variables in C, other than the effects of piezoelectric element and couplant, is 8 dB. This work clearly establishes that the overall design of the transducer device, not just the materials used for its construction, is significant in achieving excellent high temperature characteristics.

Piezoelectric materials used in this invention should have high piezoelectric and coupling co-efficients, particularly in the compressional mode of the vibration. This mode generates longitudinal ultrasonic waves that are most widely used in nondestructive testing. These materials should have low radial coupling co-efficients. The electro-mechanical losses should be minimum. Furthermore, for some ultrasonic devices low mechanical Q is desired and for the others high Q is required. The piezoelectric materials require temperature stability defined by Curie point. The Curie point is a temperature beyond which the piezoelectric materials suffer a permanent damage to their atomic structure, therefore, losing piezoelectric behavior. It is an irreversible phase transformation; any use of piezoelectric material must be confined to below the Curie point. The commonly used piezoelectric materials, generally possess high enough Curie points in order for them to be suitable for elevated temperature ultrasonic devices. Some of these materials along with their Curie points are shown in Table I.

TABLE I

| PIEZOELECTRIC MATERIAL | CURIE POINT (°C.) |
|---|---|
| Lead zirconate - lead titanate | 350 |
| Lead titanate | 260 |
| Lead meta-niobate (Low Q) | 550 |
| Lithium niobate | 1150 |

With the exception of lithium niobate, the rest of the materials are polycrystalline ceramics. These are synthesized by well known ceramic processing techniques, such as hot isostatic pressing, hydraulic pressing, slip casting, etc. These materials are fired at high temperatures in order to complete the reactions. After firing, they are cut and lapped and finished to yield the desired shapes. The faces of these materials may be electroded by using thick film or thin film metallization techniques, such as fired-on silver or gold, or room temperature metallization for electroless nickel. The metallized films described have been tested to successfully withstand temperatures up to 750° C. However, as described above, by use of conductive adhesives metallizing may not be required.

The piezoelectric materials are polarized in order to impart piezoelectric characteristics by applying high DC voltage across the faces of the materials. Lithium niobate is a single crystal and is polarized at high temperatures during the process of single crystal growth. When polycrystalline piezoelectric materials are used in this invention, their start-up stage is unpolarized. When lithium niobate is used, it is already polarized, which has the highest temperature stability, therefore it will not deteriorate during the stages of high temperature manufacture of an ultrasonic device.

While a piezoelectric material may be utilized up to its Curie point, it should be noted that some materials begin their depolarization reactions far below their Curie points. This is particularly true for lead zirconate - lead titanate and lead titanate as well as for other piezoelectric materials doped with alkali cations. In view of this, more stable piezoelectric materials, such as lead meta-niobate and lithium niobate are used in this invention. High temperature transducers made from lead meta-niobate wil be characterized by broad bandwidth frequency spectra and shorter pulse widths; thus particularly applicable to those applications that may require high resolution of defects in the test material. The transducers made from lithium niobate are characterized by narrower bandwidths and broader pulse widths. Thus, they are suitable for those applications that require deeper ultrasound penetration. These properties can be altered by varying the composition of the damping materials in order to make them applicable for specific ultrasonic applications.

When lead meta-niobate is used for high temperature ultrasonic device, it is not polarized to begin with. Its dimensions correspond to the desired specifications, while the frequency is determined by its thickness. For lithium niobate the same reasoning is applied, except that it is already polarized. The frequency is calculated by the following formula:

$$f = f_c / t,$$

where f is the natural resonant frequency in MHz; fc is the frequency constant in MHz.cm; and t is the thickness in cm, of the piezoelectric material. Thicknesses for commonly used frequencies for lead meta-niobate and lithium niobate are given in Table II.

TABLE II

| FREQUENCY MHz | LEAD META-NIOBATE | LITHIUM NIOBATE |
|---|---|---|
| | THICKNESS, cm | |
| 0.5 | 0.33 | 0.66 |
| 1.0 | 0.165 | 0.33 |
| 2.0 | 0.082 | 0.165 |
| 5.0 | 0.033 | 0.066 |

There are many refractory materials known that can meet the specifications for the high temperature flat bottom ceramic cup. These are dense alumina, tungsten carbide, zircon, zirconia, alumino-silicate, refractory metals, cermets, etc. However, in the application for this invention, the cup material should also be relatively transparent to ultrasonic frequency of the piezoelectric material. It is also preferred that this material exhibit relatively larger wavelength at a given frequency of the piezoelectric material in comparison to the wavelength in the test material at the same frequency. This property will further facilitate in increasing the thickness of the end face of the cup, which in turn will increase the strength of the cup. Ceramic materials such as dense alumina, tungsten carbide, fused silica, etc. are suitable. Alumina is particularly favored in this application because of its overall superiority. Especially desirable are high density ceramic materials which may, for example, have densities exceeding 95% and even more than 99% theoretical. Ceramic materials are best suited for the cup becaue they have thermal properties ismilar to the piezoelectric materials. Metals are not preferred because of the mismatch in thermal properties. Refractory metals have an extremely high melting point, i.e., in excess of the melting point ranges of iron, nickel, and cobalt.

Since the piezoelectric material is generally a circular disk, the cup is also fabricated in the form of a circle. The high temperature cup can be fabricated from a cylinder of dense ceramic or it can also be cast or pressed into the desired shape and size. The inside bottom of the cup must be substantially flat in order for it to make complete bond with the piezoelectric material.

Figure 2:
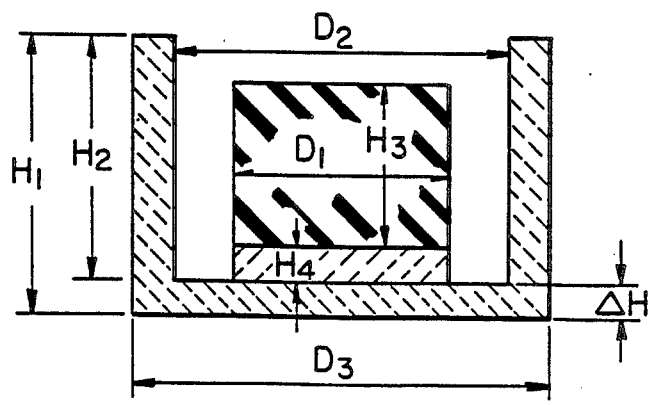
FIG. 2 is a section through a portion of a transducer device enabling explanation of certain significant dimensions.

Referring now to FIG. 2, the inner diameter $D_2$ and outer diameter $D_3$ of the cylindrical sidewall of the ceramic cup 13 are labelled as well as the outside axial length $H_1$ and the inside axial length $H_2$ of the cup. The thickness $\Delta H$ of the end wall of the cup 13, the diameter $D_1$ of the crystal 18 and damping material 22 and the axial length $H_4$ of the crystal and the axial length $H_3$ of the damping material are shown. The following relationships are preferred:

$D_2 = D_1 +$ about 0.125 inches (0.3 cm)
$D_3 = D_2 +$ about 0.125 inch (0.3 cm)
$\Delta H = \lambda_c/4$ or greater, where $\lambda_c$ equals wavelength of ultrasound being transmitted through the cup
$H_2 = H_3 + H_4 +$ about 0.25 inch (0.6 cm)
$H_3 = 16 \cdot \lambda_d$, where $\lambda_d$ is the wavelength of ultrasound in the damping material.

The thickness $\Delta H$ of the cup end wall should correspond to about one-quarter wavelength. According to a preferred embodiment, the thickness of the end wall will range between 0.015 to 0.40 inch and the thickness of the sidewall $(D_3 - D_2)$ will be more than double the thickness of the end wall. According to a preferred embodiment, the height $H_1$ of the sidewall should be at least 0.25 inch and more preferredly at least 0.50 inch.

In order to design the cup for a 2 MHz and 0.5 inch (1.25 cm) diameter transducer, for example, it would be important to know some acoustic properties of the cup, piezoelectric and damping materials, $V_c$ (longitudinal wave velocity of cup material - alumina) = 390,000 inches/s (9906 m/s)

$V_d$ (longitudinal wave velocity of damping material - polymer-tungsten) = 48,000 inches/s (1219 m/s)

$\lambda_c$ (wavelength of ultrasound at 2.0 MHz in alumina) = 0.195 inch (0.49 cm)

$\lambda_d$ (wavelength of ultrasound at 2.0 MHz in damping) = 0.024 inch (0.061 cm)

$H_4$ (thickness of the piezoelectric element at 2.0 MHz for lead meta-niobate) = 0.0325 inch (0.082 cm).

Therefore, $D_2 = 0.5 + 0.125$ or 0.625 inch (1.58 cm)
$D_3 = 0.625 + 0.125$ or 0.75 inch (1.9 cm)
$\Delta H = 0.195/4$ or 0.048 inch (0.123 cm)
$H_3 = 16 \times 0.024$ or 0.384 inch (9.75 cm)
$H_1 = 0.384 + 0.0325 + 0.048 + 0.25$ or 0.714 inch (1.81 cm).

In an embodiment for use at temperatures in excess of 500° C., after the ceramic cup has been fabricated, it is preferably metallized on its entire inner surface. The piezoelectric material and the metallized ceramic cup may be bonded with a high temperature solder or brazing compound, such as the ones containing high silver contents. In order to accomplish this task the cup and the selected piezoelectric materials are heated to a temperature slightly above the melting temperature of the solder or the brazing compound. The solder or brazing compound is sandwiched between the surfaces of the piezoelectric material and the cup. A slight pressure on the piezoelectric material will push out the excess metal. Care must be exercised at this stage in order to avoid any metal contact with the top surface electrode of the piezoelectric material. The amount of solder or braze needed to bond these members together will depend upon the size of the piezoelectric material.

The high temperature soldering or brazing compound should be selected in such a manner that, either its melting temperature is in the neighborhood of the Curie point of the piezoelectric material, or it is lower than the latter.

By using the high temperature solder, the positive lead may be electrically connected to the top of the piezoelectric material. Similarly, the ground lead may be connected to the inside of the metallized cup. The electrical leads should be composed of high temperature resistant metals, such as platinum, nickel, constantan alloy, etc.

In order to polarize the piezoelectric material, particularly the polycrystalline piezoelectric material, such as lead meta-niobate or lead zirconate-lead titanate, a high voltage DC power supply is needed. The positive lead from the piezoelectric material is connected to the negative output of the power supply. The ground lead from the high temperature cup is connected to the positive output of the power supply. The cup assembly is placed inside a heated bath of a fluid dielectric medium, such as motor or vegetable oil making sure that the piezoelectric material is fully submerged in it. The temperature of the heated bath is about 75° C.

The amount of voltage required to polarize the piezoelectric material is determined by its thickness or frequency. Most polycrystalline piezoelectric materials, such as lead meta-niobates, require about 65 VDC per 0.025 mm thickness. As an example, the Table III shows the amount of VDC required to polarize most commonly used frequencies.

TABLE III

| FREQUENCY MHZ | THICKNESS mm | VDC FOR FULL POLARIZATION |
|---|---|---|
| 0.5 | 3.3 | 8580 |
| 1.0 | 1.65 | 4290 |
| 2.0 | 0.82 | 2150 |
| 5.0 | 0.33 | 1720 |

The values shown in Table III are not only applicable to lead meta-niobates, but they can also be used to polarize most common polycrystalline piezoelectric materials. The time required to accomplish complete polarizing is normally between 5 and 10 minute, however, thicker materials may require longer times.

Upon completion of polarization, the device is ready for its use at high temperatures, that is, in the neighborhood of piezoelectric materials Curie points. To further strengthen this device, as well as to further improve its acoustic performance, such as through damping of the piezoelectric material, several modifications or enhancements may be made.

To seal and secure the piezoelectric material inside the high temperature cup it may be potted with organic or inorganic cements. Inorganic cements, such as those manufactured by Aremco and Saureisen companies, can be introduced inside the cup in paste or liquid forms. Some suitable cements are of the high purity calcium aluminate type. Many cement compositions are available that only require curing at moderate temperatures, such as to about 250° C. Once these cements have been cured, they can be safely used to much higher temperatures, such as up to 1500° C. By applying this method, certain amount of damping will also occur on the piezoelectric material.

Many high temperature glasses and glazes have been developed and are used to seal glass to metal, glass to ceramic, ceramic to ceramic, and metal to metal. Such practices are widely used in glass bulb and spark plug manufacturing. Similar glasses or their modifications are added to the high temperature ceramic cup in order to seal and secure the elements of the high temperature transducer. In case the glass seal is used, the step should be performed before polarizing the transducer.

By addition of suitable high density materials (also stable at high temperatures) to the potting cements or glasses, a high acoustic impedance material can be created. Such a material can introduce optimum acoustic impedance matched to the piezoelectric material in order to damp it suitably. Various materials of high density are: oxides of tungsten, molybdenum, chromium, iron, lead, nickel, etc. If so desired, powders of heavy metals can also be used in this application.

Having thus described the invention with the detail and particularity required by the Patent Laws, what is desired protected by Letters Patent is set forth in the following claims.

I claim:

1. A hard faced contact ultrasound transducer device for use above room temperature comprising:
   a metal case having walls defining an enclosure,
   a cup-shaped ceramic piece having a substantially flat end wall having inner and outer surfaces, the outer surface comprising a wear face through which ultrasound is transmitted and received by the transducer device, said cup-shaped ceramic piece having sidewalls extending along the entire periphery of the end face and back into the metal case,
   a piezoelectrically active element having a front and back side, the front side of the active element being bonded to the inner surface of the end wall of the cup-shaped ceramic piece, and
   means for securing the exterior of the sidewalls of the cup-shaped ceramic piece to the interior surfaces of the walls of the metal case.

2. A hard faced contact ultrasound transducer device for use above about 200° C. comprising:
   a metal case having walls defining an enclosure,
   a cup-shaped ceramic piece having a substantially flat end wall having inner and outer surfaces, the outer surface comprising a wear face through which ultrasound is transmitted and received by the transducer device, said cup-shaped ceramic piece having sidewalls extending along the entire periphery of the end face and back into the metal case,
   a piezoelectrically active element selected from the group lead meta-niobate and lithium niobate having a front and back side, the front side of the active element being bonded with conductive resin to the inner surface of the end face of the cup-shaped ceramic piece, and
   means for securing the exterior of the sidewalls of the cup-shaped ceramic piece to the interior surfaces of the walls of the metal case.

3. A hard faced contact ultrasound transducer device for use above 500° C. comprising:
   a metal case having walls defining an enclosure,
   a cup-shaped ceramic piece having a substantially flat end wall having inner and outer surfaces, the outer surface comprising a wear face through which ultrasound is transmitted and received by the transducer device, said cup-shaped ceramic piece having sidewalls extending along the entire periphery of the end face and back into the metal case, said inner surface of the end wall being metallized,
   a piezoelectrically active element selected from the group lead meta-niobate and lithium niobate having a front and back side, the front side of the active element being bonded by soldering or brazing to the metallized inner surface of the end wall of the cup-shaped ceramic piece, and
   means for securing the exterior of the sidewalls of the cup-shaped ceramic piece to the interior surfaces of the walls of the metal case.

4. The device according to claims 1, 2, or 3 wherein the cup-shaped ceramic piece is formed from high density alumina.

5. The device according to claims 1, 2, or 3 wherein the thickness of the end wall of the cup-shaped piece is between 0.015 and 0.040 inch and the thickness of the sidewall is more than double the thickness of the end wall.

6. The device according to claims 1, 2, or 3 wherein the axial length of the sidewall of the cup-shaped piece is at least 0.25 inch.

7. The device according to claim 2 wherein the active element is bonded to the end wall of the cup-shaped piece with an electrically conductive epoxy adhesive that is stable at temperatures in excess of 200° C.

8. The device according to claim 7 wherein the thickness of the end wall of the cup-shaped piece is between 0.015 and 0.040 inch and the thickness of the sidewall is more than double the thickness of the end wall.

9. The device according to claim 8 wherein the axial length of the sidewall of the cup-shaped piece is at least 0.25 inch.

10. The device according to claim 9 wherein the cup-shaped ceramic piece is formed from high density alumina.

11. The device according to claim 3 wherein the active element is bonded to the end wall of the cup-shaped piece with a solder or brazing alloy stable at temperatures in excess of 500° C.

12. The device according to claim 11 wherein the thickness of the end wall of the cup-shaped piece is between 0.015 and 0.040 inch and the thickness of the sidewall is more than double the thickness of the end wall.

13. The device according to claim 12 wherein the axial length of the sidewall of the cup-shaped piece is at least 0.25 inch.

14. The device according to claim 13 wherein the cup-shaped ceramic piece is formed from high density alumina.

15. An ultrasound transducer device comprising:
a case having walls defining an enclosure,
a cup-shaped refractory material piece having a substantially flat end wall having inner and outer surfaces, the outer surface comprising a face through which ultrasound is transmitted and received by the transducer device, said cup-shaped piece having sidewalls extending along the entire periphery of the end face and back into the case, the thickness of said sidewalls being more that double the thickness of the end wall,
a piezoelectrically active element having a front and back side, the front side of the active element being bonded to the inner surface of the end wall of the cup-shaped piece, and
means for securing the exterior of the sidewalls of the cup-shaped piece to the interior surfaces of the walls of the case.

16. An ultrasound transducer device comprising:
a case having walls defining an enclosure,
a cup-shaped refractory material piece having a substantially flat end wall having inner and outer surfaces, the outer surface comprising a wear face through which ultrasound is transmitted and received by the transducer device, said cup-shaped piece having sidewalls extending along the entire periphery of the end face and back into the case, the thickness of said sidewalls being more than double the thickness of the end wall,
a piezoelectrically active element selected from the group lead meta-niobate and lithium niobate having a front and back side, the front side of the active element being bonded with conductive resin to the inner surface of the end face of the cup-shaped piece, and
means for securing the exterior of the sidewalls of the cup-shaped piece to the interior surfaces of the walls of the case.

17. An ultrasound transducer device comprising:
a case having walls defining an enclosure,
a cup-shaped refractory material piece having a substantially flat end wall having inner and outer surfaces, the outer surface comprising a wear face through which ultrasound is transmitted and received by the transducer device, said cup-shaped piece having sidewalls extending along the entire periphery of the end face and back into the case, the thickness of said sidewalls being more than double the thickness of the end wall, said inner surface of the end wall being metallized.
a piezoelectrically active element selected from the group lead meta-niobate and lithium niobate having a front and back side, the front side of the active element being bonded by soldering or brazing to the metallized inner surface of the end wall of the cup-shaped piece, and
means for securing the exterior of the sidewalls of the cup-shaped piece to the interior surfaces of the walls of the case.

* * * * *